Figure 1:
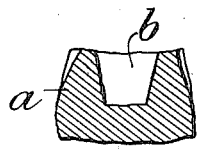

F. H. NIES.
PROCESS OF MAKING PORCELAIN INLAYS.
APPLICATION FILED JAN. 31, 1911.

1,063,376. Patented June 3, 1913.

WITNESSES:
Fred White
Rene Bruine

INVENTOR
Frederick H. Nies,
By Attorneys,
Fraser Tink & Mullen

UNITED STATES PATENT OFFICE.

FREDERICK H. NIES, OF NEW YORK, N. Y.

PROCESS OF MAKING PORCELAIN INLAYS.

1,063,376.

Specification of Letters Patent. Patented June 3, 1913.

Application filed January 31, 1911. Serial No. 865,751.

*To all whom it may concern:*

Be it known that I, FREDERICK H. NIES, a citizen of the United States, residing in the borough of Brooklyn, county of Kings, city and State of New York, have invented certain new and useful Improvements in the Process of Making Porcelain Inlays, of which the following is a specification.

This invention relates to processes for making porcelain inlays as used in dentistry, and aims to provide certain improvements therein.

Porcelain inlay fillings have the advantage over other inlays that they can be made to resemble very closely the color of the natural tooth, but in order that the inlay may not be detected by the line of cement between the inlay and cavity, it is necessary that the inlay fit very exactly into the cavity.
Previous processes have not permitted obtaining a very exactly fitting inlay. According to the best known method of obtaining porcelain inlays, a sheet of very thin gold foil is carefully worked into the cavity to form a mold or matrix of the shape of the cavity in which mold the porcelain is cast and fused. These molds have very little stiffness, are consequently very easily distorted and readily yield to the shrinkage of the inlay during cooling following the fusing operation. The inlays therefor embody these imperfections and furthermore differ in size from the size of the cavity by the thickness of the foil used to form the mold.

According to my invention I take an impression of the cavity in wax or other suitable substance, and from this impression I form a fireproof mold of earthy or silicious matter. The mold may also be formed by embedding a wax filling directly in the holding material and permitting the latter to set until it holds its shape, whereupon the wax impression is melted out. The molding material is then baked or fired until it assumes a hard, tough consistency, fitted to constitute a mold for the inlay. The porcelain in a more or less pasty condition is then worked into the mold, dried and baked. If the inlay involves a part of the external contour of the tooth, the porcelain which protrudes from the mold is modeled by hand to the desired shape. The filled mold is then baked for the required number of times at the requisite temperature to prop- erly fuse the porcelain. During the baking operation I have found in practice that the porcelain does not shrink away from the interior surfaces of the mold, but on the contrary clings to the same tenaciously so that if any shrinkage takes place it is not at the points where the inlay contacts with the walls of the cavity. Furthermore any shrinkage in the interior of the inlay can be easily corrected by filling the same with fresh porcelain and rebaking. By this method I obtain a very exactly fitting inlay.

The method just described has numerous other advantages over those heretofore in use. I find that I am enabled to obtain an inlay in which the edges are strong and durable, and well fitted to replace the natural tooth structure. According to the invention, in taking the impression of a cavity I can easily take also the impression of the adjoining teeth, from which a model can be formed and which model can be used in shaping the exterior walls of the inlay so as to bear the proper relation to the adjacent and opposite teeth. Moreover, should the inlay shrink it may be built up in the mold until it attains proper proportions.

Another advantage of my invention is that I am enabled by a proper manipulation of the wax impression (that is to say by building up a papilla thereon or forming a recess therein) to provide a holding groove, socket or recess in the inner surface of the inlay instead of having to form one after the inlay is formed, so that the cement has a proper holding surface when the inlay is applied.

The material which I prefer to use in forming my so-called fireproof mold is a mixture of silicon, oxid of aluminum and plaster of Paris in the proportion of one part each of silicon and oxid of aluminum and two parts plaster of Paris. These are ground fine and mixed with water and allowed to set, after which the mixture is heated and immersed in commercial phosphoric acid. The mixture draws up the phosphoric acid and forms phosphate of calcium to which the aluminum probably adds stability, and the silicon probably prevents shrinkage to a large extent. Any other suitable material may be used in lieu of the above mixture.

I have found in practice that it is difficult to remove the porcelain inlay from the mold after it has been fused. This difficulty, however, I have overcome by dissolution and disintegration of the mold from the inlay. A suitable solvent for this purpose is a mixture of nitric and muriatic acids or dilute muriatic acid alone. In practice I prefer to cool the mold and contained inlay and then introduce it into the solvent and boil the latter from one to two hours, after which the inlay can be easily removed from the molding material. Long periods of immersion in cold acid accomplishes the same results.

In the drawings I have shown certain figures which are illustrative of the process involved and in which,—

Figure 2:
Figure 4:
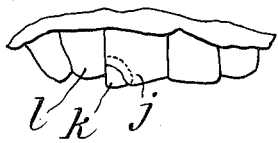
Figure 3:
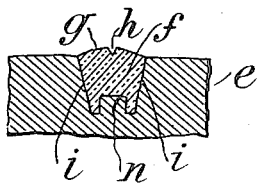

Figure 1 is a section of the upper part of a tooth showing a cavity which is required to be filled. Fig. 2 is a sectional view of an impression taken of the cavity of the tooth of Fig. 1. Fig. 3 is a view of the mold constructed of the impression of Fig. 2. Fig. 4 is a view of a model of a group of teeth showing the model acting as a mold for an inlay for one tooth.

Referring to the drawings, let $a$ indicate a tooth having a cavity $b$. $c$ indicates an impression of the cavity $b$ formed of wax or other suitable material. From this impression is made a mold $e$ of silicious material, which is baked until it attains the required degree of hardness, and its matrix is then filled with a porcelain mass $f$ of appropriate consistency. The upper surface $g$ of the porcelain mass is modeled by hand to give it the proper contour to reproduce as far as possible the original surface of the tooth $a$. As before stated, a mold of the opposite tooth in the other jaw may also be made and the inlay tested for proper occlusion. This may be done at any time, preferably prior to the glazing operation. When the inlay is completely formed, the mold and inlay are placed in a suitable muffle or oven and fused the requisite number of times; usually three fusing operations are performed. If after any of the fusing operations there is a shrinkage at the interior of the tooth, this can be repaired or filled prior to the next operation. In certain cases I prefer to make a slight indentation shown at $h$ to tend to induce the porcelain to shrink from its center so as to avoid any possibility of the exterior walls of the inlay (indicated at $i$ $i$) shrinking away from the mold.

In Fig. 4 I have illustrated a model or reproduction of five front teeth, in the middle one of which (indicated at $j$) an inlay $k$ is to be inserted. This model is made from a wax impression as before and the cavity to be filled is reproduced within the tooth $j$. The porcelain inlay is built up as nearly as possible to natural lines, and in this operation the dentist is much aided by having before him a reproduction of the other teeth. This is particularly true with regard to the tooth $l$ which is next adjacent to the tooth $j$ on the side of the latter on which the repair occurs. This enables the operator to model the inlay with proper regard to the contour of the adjacent teeth and protection of the interproximal space.

In the drawings I have shown one means of forming a bond between the inlay and tooth, such means being a recess or the like $m$ in the impression $c$ which will result in a similar recess $n$ in the inlay when the latter is cast, into which the cement will extend in setting the inlay. Other similar means may be employed if desired.

I am also enabled to very greatly increase the strength of adhesion between the inlay and the walls of the tooth by providing at the surface of the inlay what I may term a coat of crystals of silica, carborundum, ruby stone or the like. Such coat is preferably formed by mixing the crystals with a porcelain of higher fusing point than the body of the inlay, and of a thinner or more watery consistency. This mixture is worked into the fireproof mold until the necessary coating is provided and the mold is then baked. The coating thus becomes in effect a porous film of large crystals. The body of the inlay is then worked in and the mold again baked, during which time the body of the inlay is fused to the coating. I have also found that by varying the color of the crystals I have been able to obtain very satisfactory color effects in accordance with the tints indicated by the color of the teeth to be filled.

While I have described and illustrated my invention as practised by making an impression of the cavity and forming a mold directly from the impression, it is obvious that the mold may be made indirectly in any suitable manner.

It is also obvious that various other changes may be made without departing from the spirit of the invention.

In certain of the claims, I have defined the mold as an unyielding mold. By this expression I mean a mold having sufficient rigidity to withstand deformation under a high degree of heat and under ordinary handling, and having sufficient rigidity to withstand the force of contraction of a fused body which adheres to the walls of the mold.

What I claim is:—

1. The method of manufacturing inlays which comprises forming an unyielding fireproof mold of earthy material conforming to the cavity, filling said mold with porcelain, subjecting the mold and porcelain to the action of heat and separating the fused inlay from the mold.

2. The method of manufacturing inlays, which comprises forming a mold of fireproof earthy material conforming to a cavity, filling said mold with porcelain, subjecting the mold and porcelain therein to the action of heat, and disintegrating said mold to separate the inlay therefrom.

3. The method of manufacturing inlays which comprises forming a substantially unyielding mold conforming to the cavity, forming a thin coat in said mold of crystalline material, then filling said mold with porcelain, then subjecting the mold and its contained filling to the action of heat and separating the fused inlay from the mold.

In witness whereof, I have hereunto signed my name in the presence of two subscribing witnesses.

FREDERICK H. NIES.

Witnesses:
EUGENE V. MYERS,
THOMAS F. WALLACE.